United States Patent
Cheirrett et al.

(10) Patent No.: US 7,414,089 B2
(45) Date of Patent: Aug. 19, 2008

(54) MARKING AND REMOVING TURF LINES METHOD AND COMPOSITION

(75) Inventors: Mark K. Cheirrett, Seattle, WA (US); Walter Sadowski, Edmonds, WA (US)

(73) Assignee: Eco Chemical, Inc., Seattle, WA (US)

( * ) Notice: Subject to any disclaimer, the term of this patent is extended or adjusted under 35 U.S.C. 154(b) by 511 days.

(21) Appl. No.: 10/424,548

(22) Filed: Apr. 25, 2003

(65) Prior Publication Data

US 2004/0213926 A1    Oct. 28, 2004

(51) Int. Cl.
   *C08F 283/01*    (2006.01)
(52) U.S. Cl. ............... 524/513; 524/767; 524/261; 106/416; 106/460; 106/437
(58) Field of Classification Search ........... 524/513, 524/767, 261; 106/437, 416
   See application file for complete search history.

(56) References Cited

U.S. PATENT DOCUMENTS

| | | | | |
|---|---|---|---|---|
| 3,356,627 | A * | 12/1967 | Scott | ............... 524/516 |
| 4,230,609 | A * | 10/1980 | Burroway et al. | ........... 524/251 |
| 4,448,609 | A * | 5/1984 | Tear et al. | ............... 106/443 |
| 5,041,488 | A | 8/1991 | Meades | |
| 5,112,402 | A * | 5/1992 | Freeman et al. | ............. 106/416 |
| 5,514,722 | A | 5/1996 | Di Geronimo | |
| 6,077,898 | A * | 6/2000 | Flores | ............... 524/425 |
| 6,080,802 | A * | 6/2000 | Emmons et al. | ........... 523/205 |
| 6,232,392 | B1 * | 5/2001 | Warren et al. | ............. 524/513 |
| 6,613,826 | B2 * | 9/2003 | Kim et al. | ............... 524/386 |
| 6,653,265 | B2 | 11/2003 | Rossi et al. | |

FOREIGN PATENT DOCUMENTS

| | | |
|---|---|---|
| AU | 200071927 A1 | 5/2001 |
| AU | 200071927 A1 * | 5/2001 |
| FR | 2 586 357 A1 | 2/1987 |
| JP | 61-261369 A | 11/1986 |
| JP | 61261369 A * | 11/1986 |
| WO | WO 90/01051 A1 | 2/1990 |
| WO | WO 9404603 A1 * | 3/1994 |

OTHER PUBLICATIONS

Paint and Surface Coatings—Theory and Practice, 1999, Ed. Lambourne R and Strivens, T.A., p. 185-190.*

* cited by examiner

*Primary Examiner*—Ling-Siu Choi
(74) *Attorney, Agent, or Firm*—Christensen O'Connor Johnson Kindness PLLC

(57) ABSTRACT

The present invention is related to methods and compositions for marking and removing turf lines and other markings from artificial and natural turf, including sports fields. The marking compositions include alkali-activatible acrylics, including one or both of alkali-soluble resin and an alkali-swellable thickener to enable removing the dried composition with an alkaline solution.

24 Claims, No Drawings

MARKING AND REMOVING TURF LINES METHOD AND COMPOSITION

FIELD OF THE INVENTION

The present invention is related to methods and compositions for marking and removing turf lines and other markings from artificial and natural turf, including sports fields. The marking compositions include at least an alkali-activatible acrylic to enable removal of the dried composition with an alkaline solution.

BACKGROUND OF THE INVENTION

Sports are played on turf fields having markings that delineate the playing field or for other purposes. The fields have evolved from natural turf surfaces to manufactured, synthetic, or artificial turf surfaces.

When a turf playing field is used for multiple purposes, i.e., for different sports or activities requiring different markings, the old markings must be removed and newer ones applied usually under severe time constraints.

Turf playing fields have traditionally been marked with different types of opaque materials, including stones, and chalk. On modern playing fields, the lines and markings are primarily painted, woven, glued, or sewn directly into the natural or artificial playing turf surface. With the exception of chalk, these methods are considered substantially permanent marking technologies because only through severe methods can the markings be removed from the turf in a satisfactory manner.

Permanent marking technologies offer a number of advantages, such as opacity, integrity, and permanence. Opacity means the marking can be visually differentiated from the turf. Integrity means the marking stays in place even upon contact. Permanence keeps the marking in place during the intended use and in the most severe weather.

Other than woven, glued or sewn-in markings, solvent-based paints are the next most permanent marking technology. The advantages of solvent-based paints are superior durability due to excellent adhesion to artificial and natural turf, and excellent early resistance to water because of fast dry times.

Disadvantages of solvent-based paints include flammability, air pollution in terms of high VOC (volatile organic compound) emissions, toxicity, and possible damage to the artificial or natural turf and its various subsurface components. Cleanup of the application equipment after installation requires a solvent. Also, mistakes in marking are difficult to repair once applied. Furthermore, removal of solvent-based paints is a difficult and labor-intensive process, resulting in damage to the turf because of the high amounts of solvent and mechanical abrasion that are used. Removal of solvent-based paints often involves spraying copious quantities of flammable solvent on the paint, and then physically wiping it up with an absorbent material.

Water-based paints are also considered a permanent marking technology. Water-based paints are non-flammable, have little to no VOCs, are non-toxic, and are chemically benign to the turf surface. Water-based paints and equipment can be cleaned up with soap and water while still wet, and are very easy to mix and apply.

Disadvantages of water-based paints include slow dry times, reduced early water resistance as compared with solvent-based paints (may be washed off with rain or fog before the film is formed), and mistakes are also difficult to repair. Removal of water-based paints, once dried, is also very difficult, resulting in damage to the turf playing surface because of the use of solvents and mechanical abrasion.

Water-based and solvent-based paints are permanent enough that the removal process is not effective at removing all the paint and leaves paint adhering to the turf, which is referred to as "ghosting." Residual removal requires mechanical brushing. In reality, the only way that water-based and solvent-based paints are removed is through mechanical means like physically scraping the paint film from the turf.

Latex-type paint, also a water-based paint, must be broken down with high-pressure sprays, aggressive brush systems, steam cleaners, and different types of chemical detergents. Because of the high pigment to binder ratio in latex-type paints, the overall adhesion of this type of paint is unreliable and tends to wear off easily, while at the same time leaving shadowing or trace amounts of paint adhered to the turf that is difficult to fully remove. Power brushes and other abrasive systems cause damage to the turf as well as damage to the subsurface infill beneath the turf. Brushes and abrasive systems can leave holes in the turf. These harsh removal processes can drive some of the solids into the turf infill, leaving the broken paint chips in the turf field that may resurface at a later date. Rain, walking, or driving on the turf field can cause these chips to migrate to the surface, producing undesirable spots and markings on the turf field.

To remove a latex-type paint, harsh chemical solvents are required, sometimes requiring wax or other substances to keep the chemicals on the surface during dissolution. The resulting compound is a gelatinous mixture of paint and resins that are difficult to separate from the turf.

The advantage of water-based and solvent-based paint is that they are highly durable because they are made with permanent, water insoluble resin systems. The disadvantage comes from the fact that they cannot be easily removed. Consequently, the cost of the materials and the time and labor involved to remove these paints, as well as their impact on the turf, makes it impractical to use them when multi-use field configurations are required. Accordingly, there is a need for a turf marking composition that is water insoluble once dried, but that can be readily removed. The present invention provides this and related advantages.

SUMMARY OF THE INVENTION

To address the problems with the currently available technology described in the background section above, the present invention provides a durable, water insoluble, yet easily removable, turf marking composition for single or multi-use turf fields. The present invention provides a composition with pH sensitive components. The pH sensitive components are alkali-activatible acrylics that can include a binder and/or thickener. The binder and thickener components are commercially available in either their neutralized or non-neutralized state. Typically, the thickener is non-neutralized, whereas the binder is neutralized. The binder can be a combination of a pH sensitive resin and a film forming resin. In aqueous media, the thickener and binder are soluble when neutralized, i.e., salted, with a base, such as ammonia or an amine, i.e., are alkali-activatible. The neutralized aqueous composition can be applied to turf. The composition dries to a film or coating by evaporation of water, ammonia or amine, and any VOCs present in the applied composition. The dried composition reverts to a non-neutralized condition that renders the dried composition insoluble in neutral or acidic water. However, the dried composition is readily dispersed upon reactivation with a base, to make it readily removable.

The present invention provides a method for marking a turf. The method includes marking a turf with a composition, wherein the composition includes an alkali-activatible acrylic that can include one or both of an alkali-soluble resin, and an alkali-soluble thickener. The composition also at least includes a neutralizer and water. The method includes allowing the composition to dry to provide a marked turf.

In another aspect of the present invention, a method for removing a marking from turf is described. The method includes applying an alkaline solution to a marking on a turf to form a dispersion, wherein the marking includes an alkali-activatible acrylic that can include an alkali-soluble resin and an alkali-soluble thickener. The method further includes removing the dispersion from the turf.

In another aspect of the present invention, a system for marking turf and for removing markings from turf is provided. The system includes a turf marking composition and an alkaline removal solution. The turf marking composition includes a pigment for colorizing the composition, an extender for providing opacity and volume to the composition, an opacifier for providing opacity to the composition, a defoamer for suppressing foam formation. The composition includes an alkali-activatible acrylic that can include an alkali-swellable thickener for increasing viscosity of the composition, and an alkali-soluble resin for binding the components. The composition includes a neutralizer for activating one or more components to disperse in water, a wetting agent and defoamer combination for promoting wetting on organic and olefinic surfaces, wherein the defoamer suppresses foam formation of the wetting agent, and a dispersant for dispersing at least the pigment components. The alkaline removal solution includes an amine, ammonia, and water.

In another aspect of the present invention, turf having a marking thereon is provided. The turf includes a turf, and a marking thereon, wherein the marking includes an alkali-soluble resin, and an alkali-swellable thickener.

In another aspect of the present invention, a composition is provided. The composition includes an alkali-activatible acrylic; a neutralizer; a pigment; a defoamer; a wetting agent; a dispersant; and water. Optionally, the composition can include an extender, an opacifier, and a defoamer for the wetting agent.

The composition according to the present invention is nonflammable and produces very low volatile organic compound emissions. The composition according to the present invention is also nontoxic. The alkali-removable turf marking composition according to the present invention has the advantages of the permanent water-based paints, but has the additional advantage of being activated, once dried, with an alkaline solution rendering the applied composition capable of being solubilized and washed or absorbed from the turf field.

The present invention provides a turf marking composition that is water insoluble when dried, yet soluble when activated with an alkaline removal solution after drying. The present invention also provides a method of applying an alkali-removable turf marking composition to turfs, including artificial, synthetic, and natural turf surfaces. The present invention provides a method for easily removing any such marking, once dried, such that the turf is restored to its unmarked condition, without damaging the synthetic turf or the turf subsurface infill. The method according to the invention includes applying the alkali-removable turf marking composition with spray equipment, allowing the composition to dry, activating the applied turf marking composition with an alkaline removal solution, and then removing the activated composition to return the turf to an unmarked condition.

The present invention provides a method for removing an alkali-removable turf marking composition applied to turf. The method is a relatively nonaggressive, nonabrasive method, allowing most of the solids, thickener, and binder to be recovered. The process according to the present invention will result in relatively less materials migrating to the infill, producing a turf field that will not develop the undesirable spots and markings after removal of the marking composition. One or more of the components of the alkali-removable turf marking composition according to the present invention has the ability to be activated on contact with an alkaline solution.

The alkali-removable turf marking composition according to the present invention advantageously uses selected alkali-activatible acrylic resins and polymers to provide water insolubility in neutral or acidic water. However, the alkali-removable turf marking composition according to the present invention can be activated with an alkaline solution that contains a slowly evaporating amine and/or ammonia. Thus, the marking composition can be washed off and removed when desired.

DETAILED DESCRIPTION OF THE PREFERRED EMBODIMENT

An alkali-removable turf marking composition is provided that can be activated to dissolve in water, and after application to turf and drying, can be easily collected and removed from a turf field by application of an alkaline solution. In arriving at the alkali-removable turf marking composition of the invention, the inventors attempted to minimize solids content, increase opacity, and minimize binder polymer to produce a satisfactory film or coating to be used for marking turf, while selecting alkali-activatible acrylic polymers to facilitate removal. Alkali-swellable thickeners are acrylic resins or polymers that have good exterior durability and have very high viscosity at low concentrations. The present inventors theorized that alkali-activatible resins could be used as the binders in a low solids content paint system. The alkali-activatible resins may be commercially provided as insoluble non-neutralized emulsified components. When a base, such as ammonia is added, the resin or polymer is activated and becomes water soluble. As the polymer micelles become water soluble, the polymer swells into a thick clear gel. As the ammonia evaporates, the generally linear polymer chains align themselves with other polymers to form a film. The molecular weight is high enough so that the film is insoluble in water. However, when the dried film is exposed to an alkaline solution, the reactive sites on the polymer are activated again and the polymer is once again soluble in water and may be washed off and removed. When the activating compound, such as ammonia or an amine evaporates again, the concentration of polymer remains low so that it dries to a dust. Alkali-activatible compounds include alkali-swellable thickeners, and alkali-removable resins, that have a functional group reactive with a base. In one embodiment, alkali-activatible compounds include acrylic resins and polymers.

One embodiment of the marking composition for turf according to the present invention includes a pigment, an extender, an opacifier, a defoamer, an alkali-swellable thickener, an alkali-soluble binder resin, a neutralizer, a wetting agent and defoamer combination, and a dispersant.

Pigments suitable to use in the present invention include, but are not limited to inorganic or organic pigments. The most common white pigments are titanium dioxide, zinc oxide, leaded zinc oxide, zinc sulfide, and lithopone, a mixture of zinc sulfide and barium sulfate. Colored pigments include iron oxide reds, iron oxide yellows, iron oxide blacks, and iron oxide browns. Other complex inorganic color pigments can be used in the present invention, including, but not limited to bismuth vanadate, chromium (III) pigments, ultramarine pigments, cyanide iron blue, cadmium pigments, lead chromate pigments, and carbon blacks. Some of the foregoing pigments are described in Kirk-Othmer, *Concise Encyclopedia of Chemical Technology*, 4th ed., pages 1554-1562, incorporated herein by reference in its entirety for all purposes. In producing the alkali-removable turf marking composition according to the present invention, titanium dioxide was selected for its high index of refraction among white pigments. A satisfactory level of opacity was balanced with increased solids content (that would lead to increased binder) and cost. According to the invention, any one or more of the many organic and inorganic pigments known in the art can be combined to arrive at the desired color. In one embodiment, titanium dioxide pigment is about 16.66% by weight of the aqueous composition and about 57.3% by weight of the dried composition. Titanium dioxide can range from 1% to 20% by weight in the aqueous composition.

Extender pigments or extenders are typically colorless or white pigments with a refractive index normally less than 1.7. Sometimes extenders are also referred to as fillers. Extenders can provide volume and opacity to the composition. Extenders are typically derived from natural sources and can provide a variety of functionality to coatings and paints. Extenders are added to various compositions, coatings, and paints to improve application properties and to reduce costs. Extenders can be dispersed in media in which they are insoluble, but compared to other pigments, they do not provide any appreciable color properties to the composition.

An example of a suitable commercially available extender for use in the present invention includes aluminum silicate, a kaolin clay, commercially available under the designation MATTEX MX from Englehard Corp. MATTEX MX is a filler, which helps increase opacity. Pigment components (solids) and binder are minimized without sacrificing opacity, durability, and wear. Pigments use up binder functionality, that reduces the total binder functionality available to bond to the substrate. MATTEX MX is a highly structured pigment that can increase opacity without significant increase in total solids. While examples of suitable extenders are provided herein, the alkali-removable turf marking composition according to the invention may use other suitable alternatives. In one embodiment, aluminum silicate is about 6.67% by weight of the aqueous composition and about 22.9% by weight of the dried composition. Aluminum silicate can range from 5% to 25% by weight in the aqueous composition.

Opacifiers are typically fine powders that are used to reduce the transparency of coatings and paints, i.e., increase opacity. The coating becomes opaque because the particles of the opacifier scatter and reflect the light. Opacifiers include acrylics, zirconium dioxide, zirconium silicate, and tin dioxide for example.

A suitable opacifier for use in the present invention is a low solids liquid acrylic opacifier, provided as hollow spheres that refract light, commercially available under the designation ROPAQUE ULTRA. In one embodiment, the acrylic opacifier is about 1.5% by weight of the aqueous composition. ROPAQUE ULTRA may contain volatile organic compounds that may evaporate leaving solids that are about 5.2% by weight of the dried composition. Acrylic opacifier spheres can range from 0.5% to 10% by weight in the aqueous composition.

One embodiment of the alkali-removable turf marking composition according to the present invention, further includes a defoamer. Defoamers are described in Kirk-Othmer, *Concise Encyclopedia of Chemical Technology*, 4th ed., on pages 592-593, incorporated herein by reference in its entirety for all purposes. A suitable defoamer for use in the alkali-removable turf marking composition according to the present invention includes an ether, for example, a polyoxyalkylene polymer. A defoamer is selected that is capable of suppressing foam formation. A suitable commercially available defoamer having polyoxyalkylene polymer is known under the designation DEE FO PI 35, available from Ultra Additives, Inc. of Patterson, N.J. In one embodiment, the polyoxyalkylene is about 0.05% by weight of the aqueous composition. DEE FO PI 35 has negligible solids content, most of this product will evaporate during drying of the applied composition. Polyoxyalkylene polymer can range from 0.01% to 1% by weight in the aqueous composition.

One embodiment of the alkali-removable turf marking composition according to the present invention includes a dispersant. Dispersants are generally described in Kirk-Othmer, *Concise Encyclopedia of Chemical Technology*, 4th ed., on pages 630-631, incorporated herein by reference in its entirety for all purposes. One suitable dispersant for use in the present invention includes a solution of a sodium salt of an acrylic acid copolymer or an ammonium polyacrylate. A suitable commercially available dispersant is known under the designation BYK 156, available from Byk Chemie of Wallingford, Conn. The dispersant for use in the alkali-removable turf marking composition according to the invention is selected for its ability to disperse the pigment component or components in water and also to stabilize the pigment component or components, meaning preventing the pigments from reflocculating (coming back together to form agglomerates). In one embodiment, ammonium polyacrylate is about 0.08% by weight of the aqueous composition. BYK 156 has negligible solids content, most of this product will evaporate during drying of the applied composition. Ammonium polyacrylate can range from 0.01% to 2% by weight in the aqueous composition.

One embodiment of the alkali-removable turf marking composition according to the present invention further includes a wetting agent and defoamer combination. Wetting agents are considered surfactants, described in Kirk-Othmer, *Concise Encyclopedia of Chemical Technology*, 4th ed., on pages 1949-1953, incorporated herein by reference in its entirety for all purposes. A suitable wetting agent for use in the present invention includes an acetylenic diol. A suitable commercially available nonionic wetting agent for use in the present invention is known under the designation SURFYNOL 104 DPM, available from Air Products and Chemicals Inc., Allentown, Pa. One function of the wetting agent is to reduce the surface tension and promote wetting on olefinic surfaces, such as the synthetic polyolefin fibers that make up an artificial turf field and organic surfaces such as grass. In some instances, the wetting agent may optionally may act as a defoamer and wetting agent. Solvents that are suitable to use with wetting agents include alkoxylated aliphatic alcohols, such as 2-methoxymethylethoxypropanol. One suitable commercially available wetting agent/defoamer is a SURFYNOL 104 DPM combination. The DPM solvent additive is 2-methoxymethylethoxypropanol, an alkoxylated aliphatic alcohol. In one embodiment, acetylenic diol is about 0.03% by weight of the aqueous composition and 2-methoxymethylethoxypropanol is about 0.04% by weight. DPM has no solids content; SURFYNOL 104 solids will make up trace amounts of solids in the dried composition. Acetylenic diol can range from 0.01% to 1% by weight and 2-methoxymethylethoxypropanol can range from 0.01% to 1% by weight in the aqueous composition.

One embodiment of the alkali-removable turf marking composition according to the present invention includes alkali-activatible compounds, including acrylics. The alkali-activatible acrylics can include binders and thickeners, the difference being binders have a lower molecular weight as compared with the thickeners.

Alkali-swellable thickeners include pH-sensitive resins, such as modified acrylic resins. One example of a suitable commercially available alkali-swellable thickener for use in the alkali-removable turf marking composition according to the invention is known under the designation ACRYSOL ASE 60 available from Rohm and Haas, Philadelphia, Pa. The suitable alkali-swellable thickener for use according to the present invention is selected based on its properties to control viscosity of the composition, prior to application. ACRYSOL ASE 60 exhibits viscosity build comparable to high molecular weight cellulosic thickeners. Viscosity build occurs by neutralization or adjustment of the pH sensitive polyacrylates to a pH of 7 to 10. In one embodiment, ACRYSOL ASE 60 is about 1.67% by weight of the composition. ACRYSOL ASE 60 solids will be about 1.7% by weight in the dried composition.

The alkali-soluble binder binds the solids into a film or coating, and to bind the film to the turf substrate. Suitable alkali soluble resins to use as binders in the present invention include pH sensitive acrylics resins. One suitable commercially available alkali-soluble resin according to the present invention is known by the designation RAYKOTE 191, available from Specialty Polymers, Inc., of Woodburn, Oreg. RAYKOTE 191 includes a styrene acrylic copolymer. RAYKOTE 191 is believed to have a pre-swollen (neutralized) acrylic compound and a film forming resin that is not alkali activatible. The film forming resin provides adhesion and bonding, and the pre-swollen interdispersed acrylic compound provides alkali activation to render the film removable. According to the present invention, the alkali-soluble resin is used as the vehicle to hold the dried components together as a film or coating until activated by an alkaline removal solution. For the removal of field markings, the film is activated by an alkaline solution. The acrylic resins will break down in response to the adjustment in pH, releasing the components and film from the turf substrate and the dispersion can then be washed and removed.

In one embodiment of the alkali-removable turf marking composition, alkali-activatible acrylics including one or both of the binder and thickener are about 4% by weight, but can range from 0.1% to 25% by weight in the aqueous composition.

The alkali-removable turf marking composition according to the present invention further includes water and a neutralizer or base, such as ammonia, to elevate the pH of the mixture in order to disperse one or more of the non-neutralized alkali-activated components in water. A suitable pH of the mixture is greater than 7. A suitable pH range is between 7 and 10. A suitable neutralizer will produce salts of the selected alkali-activated compounds to increase their solubility and thus viscosity throughout the composition. In one embodiment, ammonia is about 0.5% by weight in the aqueous composition, but can range from 0.1% to 10%; and water is about 69.5% by weight but can range from 25% to 80% by weight in the aqueous composition.

In another aspect of the present invention, a method for making an alkali-removable turf marking composition according to the present invention is provided. It is to be appreciated that while one example of making an alkali-removable turf marking composition is provided including specific weights of the components, the weight percentage of the components can vary according to batch size, equipment, and the intended application. A representative method for making an alkali-removable turf marking composition is described below. One hundred pounds of water is added to a tank. Two pounds of DEE FO PI 35 and 2.5 pounds of BYK 156 are added to the tank while the contents are mixed under slow agitation. The speed is increased. Under high speed agitation (high speed dispersion), 250 pounds of titanium dioxide and 100 pounds of MATTEX MX are slowly sifted into the mixture. All the components are ground until dispersed. After suitable dispersion has occurred, the speed may be reduced. To a second tank, 400 pounds of water and 25 pounds of ACRYSOL ASE 60 are added. The contents of the first tank are added to the second tank, and the combined contents of the second tank are agitated. To the mixture in the second tank, 75 pounds of ROPAQUE ULTRA is added. Then, 125 pounds of RAYKOTE 191 is added. In a third vessel, 9 pounds of ammonia and 9 pounds of water in a 1:1 weight ratio are mixed and then added to the mixture in the second tank. Two pounds of the SURFYNOL 104 DPM is added to the mixture. Water is then added to achieve the desired dilution. In one embodiment, 399 pounds of water can be added.

The components just described for making one embodiment of an alkali-removable turf marking composition are provided below in Table 1, wherein the column W/G is lb/gal, the column NV W/G describes lb/gal of non-volatile components, and the column % NV describes the percent of non-volatile components.

TABLE 1

| Material | Pounds | W/G | NV W/G | % NV | Solid lbs | Gallons | Solid Gal. |
|---|---|---|---|---|---|---|---|
| water | 100.00 | 8.330 | | | 0 | 12.005 | |
| DEE FO PI 35 | 2.00 | 8.650 | | | 0.00 | 0.231 | |
| BYK 156 | 2.50 | 9.82 | | .5 | 0.00 | 0.25 | .16 |
| Titanium dioxide | 250.00 | 33.110 | 33.110 | 1 | 250.00 | 7.551 | 7.551 |
| MATTEX MX grind | 100.00 | 21.660 | 21.660 | 1 | 100.00 | 4.617 | 4.617 |
| water | 400.00 | 8.330 | | | 0.00 | 48.019 | |
| SURFYNOL 104DPM | 2.00 | 7.600 | 7.400 | 50 | 1.00 | 0.263 | 0.135 |
| ACRYSOL ASE 60 | 25.00 | 9.160 | 10.000 | 28 | 7.50 | 2.729 | 0.750 |
| RAYKOTE 191 | 125.00 | 8.81 | 9.00 | 50 | 56.25 | 14.156 | 6.055 |

TABLE 1-continued

| Material | Pounds | W/G | NV W/G | % NV | Solid lbs | Gallons | Solid Gal. |
|---|---|---|---|---|---|---|---|
| add grind | | | | | | | |
| ROPAQUE ULTRA | 75.00 | 8.500 | 8.920 | 30 | 22.50 | 8.824 | 2.522 |
| ammonia | 9.00 | 7.500 | | | 0.00 | 1.200 | |
| water | 100.00 | 8.330 | | | 0.00 | 12.005 | |
| water | 308.000 | 8.330 | | | 0.00 | 36.975 | |

In a further aspect according to the present invention, a method for marking a turf with an alkali-removable turf marking composition is provided. The alkali-removable turf marking composition is based on considerations particular to the intended application. For example, the formulation described above is formulated to be used on an artificial turf field, specifically one that has polyolefin fibers or other synthetic or artificial fibers, such as nylon. However, the formulation may be applied to natural turf surfaces as well. Marking compositions for natural or other synthetic turf fields may have varying amounts of components. The aqueous embodiment of the alkali-removable turf marking composition can contain at least one from every class of pigments, extenders, opacifiers, defoamers, alkali-activatible acrylics, that include alkali-swellable thickeners and alkali-swellable resins, neutralizers, wetting agent/defoamer combinations, and dispersants. However, the relative proportions of these components can vary in every application. Such unique formulations may take into account the intended turf texture, turf material, weather, light, moisture, and the desired opacity and color. The alkali-removable turf marking composition can be thinned to any desired consistency with water prior to application. The turf surface to be marked can be prepared by cleaning, vacuuming, drying, or any other process to enhance the bonding and eventual appearance of the alkali-removable turf marking composition, once dried. The turf can be any suitable artificial, synthetic, man-made, or natural turf. Turf, as used herein, broadly includes any natural grass or synthetic, artificial, or manufactured turf. Representative turf fields that may be suitable in the method according to the invention include sports fields, such as football, soccer, baseball, or any other sports field that uses markings or lines denoting the playing field or any other visual marking that may form part of the playing field surface or any associated field area. The turf field to be marked can be surveyed, and after deciding on the lines and designs of the markings, the alkali-removable turf marking composition can be applied with any suitable spraying equipment, and/or by using stencils and applying the turf-marking composition with brushes or rollers, or in any other suitable known manner for applying marking and paint compositions. After application of the alkali-removable turf marking composition, any marking and/or lines are allowed to dry by allowing the ammonia, water, and other volatile organic compounds to evaporate leaving the solids in a film bonded to the turf substrates. The components in the composition coalesce into a film that is insoluble in water, but because of the alkali-activatible components, the film can be removed with an alkaline solution. Typically, drying times can range from 1 to 6 hours. Once dried, the alkali-removable turf marking composition is resistant to removal with neutral or acidic pH water providing a suitable playing field that will withstand sports activities, like any solvent-based or water-based paint. However, unlike solvent-based or water-based paints, the alkali-removable turf marking composition according to the invention can be removed with an alkaline solution.

A further aspect of the present invention includes a method for removing alkali-removable turf marking composition from turf having the dried composition applied thereon. The present invention provides a temporary turf marking composition that is water insoluble once dry. However, the dried alkali-removable turf marking composition becomes soluble when activated with an alkaline removal solution. Alkaline solution applied on a dried composition according to the invention causes breaking of the bonds between the binder and the turf substrate. In one embodiment for removing an alkali-removable turf marking composition, the method includes, optionally wetting the turf having the dried alkali-removable turf marking composition applied thereon. The water can be applied with any suitable low-pressure water source, such as any garden hose or spray equipment. A removal composition, including an alkaline compound, such as an amine, is applied to the dried alkali-removable turf marking composition. A suitable commercially available amine for use in the removal composition according to the present invention is known under the designation M-AMINE-1. M-AMINE-1 is a proprietary amine that has a reduced odor and a lower evaporation rate as compared with ammonia. M-AMINE-1 is available from Merlyn Coatings and Chemicals of Freelton, Ontario, Canada. The solution contains about 8% M-AMINE-1, 2% ammonia, and 90% water. The aqueous alkaline removal composition is applied to the dried alkali-removable turf markings with any suitable equipment, including spray equipment, brushes, or rollers. Sufficient time is allowed for the alkali-removable turf marking composition to disperse, or break down into a dispersed state. In one embodiment, water under mild pressure can be sprayed to facilitate the breakdown and dispersal of the marking composition into a highly diluted liquid state. Removal may be accomplished by any suitable method, including vacuuming, sponging with a system known in the trade as a "water hog," or simply wiping up with paper towels or rags. Optionally, the subsurface infill can be hosed to further extract the broken down film particles of alkali-removable turf marking composition that may have migrated to the turf subsurface infill. The present invention will provide an easily removable turf marking composition that will reduce "ghost" markings on the turf field as compared with solvent-based or water-based paints. If there are any traces of the alkali-removable turf marking composition left on the turf, the foregoing removal procedure can be repeated as often as necessary.

In a further aspect according to the present invention, an alkali-removable turf marking composition and alkaline removal composition, is provided together as a system.

In another aspect according to the present invention, a turf field having alkali-removable markings is provided. The turf field can be any artificial, synthetic or natural turf. A suitable turf is any artificial, synthetic, or natural grass sports field. Markings can be any designs, including lines or insignia or numerals. The turf markings include the pH sensitive, alkali-activatible compounds of the alkali-turf marking composition wherein the composition has been allowed to coalesce into a film or coating, after evaporation of ammonia, water, and any volatile organic compounds.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An easily removable paint composition comprising:
   (a) an alkali-activatible acrylic binder;
   (b) a neutralizer;
   (c) a pigment;
   (d) a defoamer comprising 2-methoxymethylethoxypropanol;
   (e) a wetting agent;
   (f) a dispersant;
   (g) a thickener consisting essentially of an alkali-swellable, pH-sensitive acrylic resin; and
   (h) water, wherein the paint composition is water-insoluble in neutral and acidic solutions and water-soluble in alkaline solutions, when dried.

2. The composition of claim 1, wherein the alkali-activatible acrylic comprises a styrene acrylic copolymer.

3. The composition of claim 2, comprising 0.1% by weight to 25% by weight styrene acrylic copolymer.

4. The composition of claim 1, wherein the neutralizer comprises ammonia.

5. The composition of claim 4, comprising 0.1% by weight to 10% by weight ammonia.

6. The composition of claim 1, wherein the pigment comprises titanium dioxide.

7. The composition of claim 6, comprising 1% by weight to 20% by weight titanium dioxide.

8. The composition of claim 1, wherein the wetting agent comprises an acetylenic diol.

9. The composition of claim 8, comprising 0.01% by weight to 1% by weight acetylenic diol.

10. The composition of claim 1, wherein the dispersant comprises an ammonium polyacrylate.

11. The composition of claim 10, comprising 0.01% by weight to 2% by weight ammonium polyacrylate.

12. The composition of claim 1, comprising 25% by weight to 80% by weight water.

13. The composition of claim 1, further comprising an extender.

14. The composition of claim 13, wherein the extender comprises metal silicate.

15. The composition of claim 14, comprising 5% by weight to 25% by weight metal silicate.

16. The composition of claim 1, further comprising an opacifier.

17. The composition of claim 16, wherein the opacifier comprises hollow acrylic spheres.

18. The composition of claim 17, comprising 0.5% by weight to 10% by weight hollow acrylic spheres.

19. The composition of claim 1, comprising 0.01% by weight to 1% by weight 2-methoxymethylethoxypropanol.

20. The composition of claim 1, wherein the thickener consists of an alkali-swellable, pH-sensitive acrylic resin.

21. A removable paint composition comprising:
   (a) an alkali-activatible acrylic binder;
   (b) a neutralizer;
   (c) a pigment;
   (d) a defoamer comprising 2-methoxymethylethoxypropanol;
   (e) a thickener consisting essentially of an alkali-swellable, pH-sensitive resin; and
   (f) water, wherein the paint composition is water-insoluble in neutral and acidic solutions and water-soluble in alkaline solutions, when dried.

22. The composition of claim 21, wherein the thickener consists of an alkali-swellable, pH-sensitive acrylic resin.

23. A removable paint composition comprising:
   (a) an alkali-activatible acrylic binder;
   (b) a neutralizer;
   (c) a pigment;
   (d) a defoamer comprising 2-methoxymethylethoxypropanol;
   (e) a wetting agent;
   (f) a dispersant;
   (g) a thickener comprising an alkali-swellable, pH-sensitive acrylic resin; and
   (h) water, wherein the paint composition is water-insoluble in neutral and acidic solutions and water-soluble in alkaline solutions, when dried.

24. A removable paint composition comprising:
   (a) an alkali-activatible acrylic binder;
   (b) a neutralizer;
   (c) a pigment;
   (d) a defoamer comprising 2-methoxymethylethoxypropanol;
   (e) a thickener comprising an alkali-swellable, pH-sensitive resin; and
   (f) water, wherein the paint composition is water-insoluble in neutral and acidic solutions and water-soluble in alkaline solutions, when dried.

\* \* \* \* \*